UNITED STATES PATENT OFFICE.

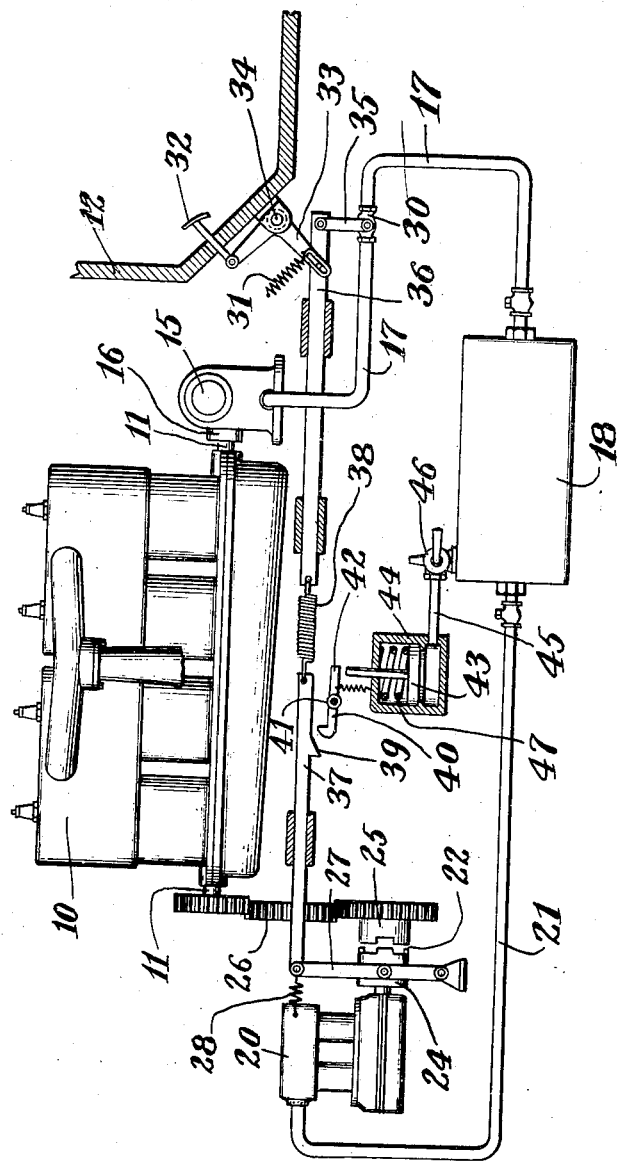

ALDEN L. McMURTRY, OF SOUND BEACH, CONNECTICUT.

PNEUMATIC STARTER FOR MOTOR-VEHICLES.

1,133,488.   Specification of Letters Patent.   Patented Mar. 30, 1915.

Application filed March 13, 1913. Serial No. 753,942.

*To all whom it may concern:*

Be it known that I, ALDEN L. MCMURTRY, a citizen of the United States, and a resident of Sound Beach, in the county of Fairfield, State of Connecticut, have invented certain new and useful Improvements in Pneumatic Starters for Motor-Vehicles, of which the following is a specification, reference being had to the accompanying drawings, forming a part thereof.

My invention relates to starting apparatus for internal combustion engines and particularly to such apparatus as is actuated by pneumatic pressure and is adapted to be used on automobiles or other motor vehicles.

The object of my invention is to provide for maintaining substantially full pressure in the supply tank or reservoir of apparatus of the character above indicated by automatically starting the compressor when the engine starter is actuated, and to prevent a careless operator from driving the compressor unnecessarily by automatically uncoupling the same from the engine when full pressure in the tank is restored.

I will describe my invention in the following specification and point out the novel features thereof in appended claims.

The single figure of the accompanying drawings is a partially diagrammatic elevation of an automobile engine and starting apparatus therefor, embodying my invention, the dash board of the vehicle being shown in section.

10 is an internal combustion engine having a shaft 11. 12 represents the dashboard of an automobile or motor vehicle which is driven by the engine. A compressed air motor or starter 15 is operatively connected to the engine shaft by suitable gearing at 16. It is connected by suitable piping or hose 17 to a storage tank or reservoir 18. A compressor 20 is connected to the tank by piping 21 and is arranged to be driven by the engine when a clutch 22 is set. One member 24 of the clutch is slidably mounted on the shaft 24 of the compressor, a spline (not shown) or other well known means being utilized for preventing the clutch member from rotating independently thereof. A coöperating clutch member 25 is operatively connected to the engine shaft by some suitable arrangement such for example as suitable gearing 26. The clutch is arranged to be set by throwing a lever 27 in opposition to a spring 28. A control valve 30 which is normally closed by a spring 31, is located in the pipe 17 and may be opened to start the engine by actuating the pedal 32. The pedal is connected with a bell crank lever 33 which is pivoted at 34 and is connected to the valve lever 35 by a slidable rod 36. The rod 36 extends beyond the bell crank lever 33, which is connected to an intermediate point therein, and is yieldingly connected to a rod 37 by an interposed spring 38. The rod 37 is connected at its opposite end to the clutch lever 27 and has a lateral projection or lug 39. A latch 40 is pivoted at 41 and has an arm 42 which is arranged to be actuated by a plunger 43 when the pressure in the tank 18 exceeds a predetermined value. The plunger acts in a closed cylinder 44 which is connected to the tank by a pipe 45 preferably provided with a relief valve 46. A spring 47 tends to hold the plunger down in opposition to the pressure supplied from the tank.

When an operator desires to start the engine he presses the pedal 32 in opposition to the spring 31 thereby opening the valve 30 and supplying motive fluid to the motor or starter 15. The engine is then started and is ready to propel the vehicle in the usual way. When the pedal 32 is pressed, the clutch lever 27 is pulled to the right in the drawing, the rod 37 being moved in response to the movement of the rod 36. The spring 28 tends to hold the clutch released but it is weaker than the spring 38 which connects the rods 36 and 37. The clutch is thus set and is held by the latch 40 which now engages the projection 39. Whenever the engine is started by actuating the pedal the compressor is simultaneously coupled to the engine. As soon as the engine has started, the pedal may be released and the valve 30 closed by the spring 31 which also returns the parts 33 and 36 to their original positions. The rod 37 is however still held by the latch 40, and is only released when the pressure in the tank is restored to normal and exceeds a predetermined value. The spring 38 is however relieved of tension. When the pressure has been so restored, the plunger 43 is pushed up in opposition to the spring 47 and releases the latch 40. The spring 28 then releases the clutch and pulls the rod 37 into its original position.

Attention is particularly directed to the fact that the clutch 22 is always thrown in when the engine is at rest as this is the only time the starter is wanted, and consequently it is possible to utilize a very simple inexpensive clutch structure such for example as that illustrated in the drawing, which is not adapted to be set when the engine is running. The additional lead on the engine at starting due to the compressor is very small because the compressor load builds up with its speed.

It is obviously desirable to keep the tank 18 relatively small and its pressure is then liable to be materially reduced each time it is drawn from for starting the engine. At the same time it is particularly bad practice to keep the compressor running unnecessarily, as is frequently done by careless or ignorant operators, because the compressor is liable to be worn out in a comparatively short time and the operating load on the engine materially increased.

The arrangement of my invention provides for maintaining the pressure in the tank by restoring it each time the engine starter is actuated. At the same time the compressor is automatically uncoupled, as soon as the pressure in the tank is restored.

The size and arrangement of parts and the structural details illustrated may be varied without departing from the spirit and scope of my invention, I therefore intend that only such limitations be imposed as are indicated by the appended claims.

What I claim is:

1. The combination with an engine, a fluid actuated starter therefor, a storage tank and a compressor, of means for controlling the supply of motive fluid from the tank to the starter, a coupling device between the engine and the compressor, and a mechanical connection between said fluid controlling means and the coupling device whereby they may be actuated together by an operator.

2. The combination with an engine, a fluid actuated starter therefor, a storage tank and a compressor, of means for controlling the supply of motive fluid from the tank to the starter, a releasable coupling device between the engine and the compressor, and a mechanical connection between said fluid controlling means and the coupling device whereby they may be actuated together by an operator, and means dependent upon a restoration of pressure in the tank for releasing the coupling device.

3. The combination with an internal combustion engine, a fluid actuated starter therefor, a storage tank and a compressor, of a control valve between the storage tank and the starter and a controller for opening the valve arranged to simultaneously couple the compressor to the engine and means dependent upon a restoration of pressure in the tank for uncoupling the compressor.

4. The combination with an internal combustion engine, a fluid actuated starter therefor, a storage tank and a compressor, of a control valve between the storage tank and the starter and a controller for opening the valve arranged to simultaneously couple the compressor to the engine, means for maintaining the coupling between the compressor and the engine independently of said controller and means dependent upon a predetermined pressure in the tank for releasing said maintaining means.

5. The combination with an internal combustion engine, a fluid actuated starter therefor, a storage tank and a compressor, of a control valve between the storage tank and the starter, a controller for opening the valve arranged to simultaneously couple the compressor to the engine, a spring tending to uncouple the compressor from the engine, a latch for maintaining the coupling in opposition to the spring and a plunger influenced by the pressure in the tank for releasing the latch.

6. The combination with an internal combustion engine, a fluid actuated starter therefor, a storage tank, a compressor and a clutch for operatively connecting the compressor to the engine, of a valve between the storage tank and the starter, a controller arranged to open the valve but tending to hold it closed, a yielding connection between the controller and said clutch, a latch for holding the clutch set independently of the controller and means responsive to the pressure in the tank for releasing the latch.

7. The combination with an internal combustion engine, a fluid actuated starter therefor, a storage tank, a compressor and a clutch for operatively connecting the compressor to the engine, of a valve between the storage tank and the starter, a control pedal operatively connected to the valve, a spring tending to hold the valve closed, a spring tending to hold the clutch open, a yielding connection between the pedal and the clutch, a latch for holding the clutch closed and means dependent upon a predetermined pressure in the tank for releasing the latch.

8. The combination with an internal combustion engine, and a starter therefor, of means adapted to be coupled to the engine for supplying motive power to the starter, interposed storage means, a controller for supplying energy from the storage means to the starter and arranged to couple said motive power supply means to the engine and automatic means for uncoupling the motive power supply means from the engine when the energy stored in said storage means exceeds a predetermined value.

9. The combination with an internal combustion engine, a fluid actuated starter therefor, a storage tank and a compressor, of a control valve between the storage tank and the starter and a controller for opening the valve arranged to simultaneously couple the compressor to the engine, and means for maintaining the coupling between the compressor and the engine independently of said controller.

10. The combination with an internal combustion engine, a fluid actuated starter therefor, a storage tank, a compressor and a clutch for operatively connecting the compressor to the engine, of a valve between the storage tank and the starter, a control pedal operatively connected to the valve, a spring tending to hold the valve closed, a spring tending to hold the clutch open, a yielding connection between the pedal and the clutch and a latch for holding the clutch closed.

In witness whereof I have hereunto set my hand this 14th day of February, in the year 1913.

ALDEN L. McMURTRY.

Witnesses:
RICHARD O. SMITH,
E. W. LEE.